(12) United States Patent
Nichols et al.

(10) Patent No.: US 12,005,974 B2
(45) Date of Patent: Jun. 11, 2024

(54) METHODS AND APPARATUS TO CENTER A STEERING WHEEL

(71) Applicant: Ford Global Technologies, LLC, Dearborn, MI (US)

(72) Inventors: Daniel James Nichols, Northville, MI (US); William James Bouse, Ann Arbor, MI (US); Justin Sekula, Berkley, MI (US); Alex Parker, Novi, MI (US); Zhongzhou Yang, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 637 days.

(21) Appl. No.: 17/201,312

(22) Filed: Mar. 15, 2021

(65) Prior Publication Data

US 2022/0289276 A1    Sep. 15, 2022

(51) Int. Cl.
*B62D 5/04* (2006.01)
*B62D 15/02* (2006.01)

(52) U.S. Cl.
CPC ......... *B62D 5/0466* (2013.01); *B62D 5/0481* (2013.01); *B62D 15/0215* (2013.01)

(58) Field of Classification Search
CPC . B62D 5/0466; B62D 5/0481; B62D 15/0215
See application file for complete search history.

(56) References Cited

U.S. PATENT DOCUMENTS

| | | | |
|---|---|---|---|
| 8,406,958 | B2 | 3/2013 | Kim |
| 9,434,415 | B2 | 9/2016 | Lavoie |
| 10,053,149 | B1 | 8/2018 | Christiansen |
| 10,676,121 | B2 | 6/2020 | Lubischer et al. |
| 2020/0361530 | A1 | 11/2020 | Polmans et al. |

FOREIGN PATENT DOCUMENTS

| | | |
|---|---|---|
| CN | 102897210 | 1/2013 |
| DE | 102009000244 A1 | 7/2010 |
| KR | 101796915 | 11/2017 |
| KR | 20190026299 | 3/2019 |

*Primary Examiner* — Mathew Franklin Gordon
(74) *Attorney, Agent, or Firm* — Lorne Forsythe; HANLEY, FLIGHT & ZIMMERMAN, LLC (57) ABSTRACT

Methods and apparatus are disclosed herein to center a steering wheel. An example vehicle includes a steering position sensor to identify a steering wheel position, a pinion angle identifier to compare a first steering position angle to a second steering position angle, the second steering position angle corresponding to a centered steering wheel position, and an angle modifier to adjust the first steering position angle to match the second steering position angle.

20 Claims, 7 Drawing Sheets

| Zone 1 Difference ||||||||||
|---|---|---|---|---|---|---|---|---|---|
| Target (deg) | 0 ||| 360 ||| -360 |||
| Approach from: | Either | Left | Right | Either | Left | Right | Either | Left | Right |
| Average | 1.17 | 1.19 | 1.15 | 2.86 | 2.86 | 2.86 | 2.13 | 2.02 | 2.48 |
| σ | 0.61 | 0.69 | 0.51 | 0.59 | 0.61 | 0.59 | 0.52 | 0.55 | 0.04 |
| Average + 3σ | 2.99 | 3.26 | 2.68 | 4.64 | 4.68 | 4.61 | 3.69 | 3.67 | 2.59 |

| Zone 2 Difference ||||||||||
|---|---|---|---|---|---|---|---|---|---|
| Target (deg) | 0 ||| 360 ||| -360 |||
| Approach from: | Either | Left | Right | Either | Left | Right | Either | Left | Right |
| Average | 32.12 | 31.81 | 32.42 | 26.99 | 19.57 | 31.94 | 30.53 | 35.93 | 14.32 |
| σ | 4.31 | 4.11 | 4.47 | 7.73 | 2.97 | 4.74 | 10.61 | 3.79 | 0.54 |
| Average + 3σ | 45.04 | 44.15 | 45.85 | 50.17 | 28.49 | 46.17 | 62.35 | 47.30 | 15.94 |

METHODS AND APPARATUS TO CENTER A STEERING WHEEL

FIELD OF THE DISCLOSURE

This disclosure relates generally to vehicles and, more particularly, to methods and apparatus to center a steering wheel.

BACKGROUND

A steering wheel is configured to change a driving direction of a vehicle based on a rotation of the wheel in a particular direction. For example, a driver steering the wheel in a given direction causes a system of pivoted joints to interact, thereby transferring the motion of the steering wheel into a motion of one or more road wheels. Steering systems in use include rack and pinion systems as well as steering box systems. The rack and pinion system relies on a gear wheel (e.g., a pinion) at the base of the steering column that causes a rack to translate from side to side, propagating the motion to the road wheels. The steering-box system includes a worm gear, which can be used to move a drop arm linked by a track rod to a steering arm, resulting in the movement of the front wheels. Modern vehicle steering wheels can be configured to retract to allow additional cabin space.

SUMMARY

Methods and apparatus to center a steering wheel are disclosed herein. An example vehicle includes a steering position sensor to identify a steering wheel position and a pinion angle identifier to compare a first steering position angle to a second steering position angle, the second steering position angle corresponding to a centered steering wheel position. The example vehicle also includes an angle modifier to adjust the first steering position angle to match the second steering position angle.

An example method includes identifying, using a steering position sensor, a steering wheel position and comparing a first steering position angle to a second steering position angle, the second steering position angle corresponding to a centered steering wheel position. The example method also includes adjusting the first steering position angle to match the second steering position angle.

An example non-transitory computer readable storage medium includes instructions that, when executed, cause a processor to at least identify a steering wheel position and compare a first steering position angle to a second steering position angle, the second steering position angle corresponding to a centered steering wheel position. The example instructions can also cause the processor to adjust the first steering position angle to match the second steering position angle.

BRIEF DESCRIPTION OF THE DRAWINGS

The figures are not to scale. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A stowable steering wheel can be used to provide additional room in a vehicle cabin for multiple uses. For example, a driver entering or exiting a vehicle can have additional space to maneuver. Power steering system components in addition to the steering wheel can include a steering column, a steering coupler, steering gear, and a power steering pump. Electric power steering systems, as compared to hydraulic systems, can include additional components such as sensors, actuators, motors, and an electronic control unit. Hydraulic power steering relies on hydraulic pressure supplied by an engine-driven pump. Electric power steering systems use an electric motor that is attached to the steering rack or the steering column, while the electronic control unit determines the steering dynamics.

Steering systems in use include rack and pinion systems as well as steering box systems. The rack and pinion system relies on a gear wheel (e.g., pinion) at the base of the steering column that causes a rack to translate from side to side, propagating the motion to the road wheels. For example, the pinion gear can be connected to a steering shaft such that as the steering wheel turns, the pinion gear rotates while moving the rack in a linear motion. As such, when the wheel is turned, the pinion gear rotates, moving the rack in a back-and-forth motion that turns the wheels left or right. In contrast to the rack and pinion system, the steering-box system includes a worm gear, which can be used to move a drop arm linked by a track rod to a steering arm, resulting in the movement of the front wheels.

In vehicles that include a stowable steering wheel, it is necessary to return a steering wheel position back to the center before steering is stowed. While the steering position can be easily returned to the center when actuators are providing forces to hold a steering position, it can be difficult to ascertain that steering is still centered when the actuators are no longer providing forces to hold the steering position. For example, the steering position may change due to loads from tire deformation when actuators do not provide forces to hold the steering position in the center.

Methods and apparatus disclosed herein can be used to center a steering wheel. In the examples disclosed herein, a steering position sensor in the steering column can be used to determine if the steering wheel is centered. For example, motors in electrical power steering can be used to change a steering position. An external angle controller (EAC) in electrical power steering can be used for the motor controller to change the steering angle. In the examples disclosed herein, when the steering angle is determined to be far from the center, the EAC can be used to rapidly move the steering wheel back to the center. Once the steering angle has reached zero (e.g., the wheel is centered), the EAC can be disabled to once again measure the steering angle. In some examples, a steering angle difference can be present after the EAC has been disabled (e.g., the steering wheel is off-center). In the examples disclosed herein, the steering angle difference from the center position (e.g., zero degrees) can be identified. By re-engaging the EAC, the steering angle can be ramped to an opposite of the identified angle difference (e.g., an offset of 10 degrees would result in the EAC ramping the steering wheel to −10 degrees). As such, the steering can return to the center once the EAC is disabled, such that the steering wheel remains centered even when actuators have been disengaged (e.g., no longer providing forces to hold the steering position).

Figure 1A:
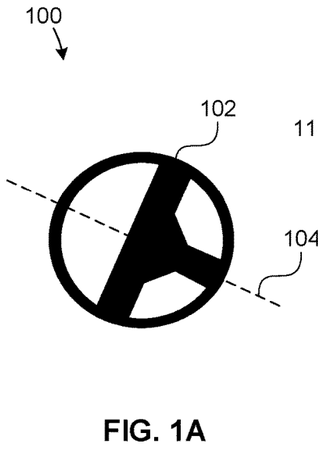
FIG. 1A illustrates an example first steering wheel position when the steering wheel has been turned by hand prior to being released.
Figure 1B:
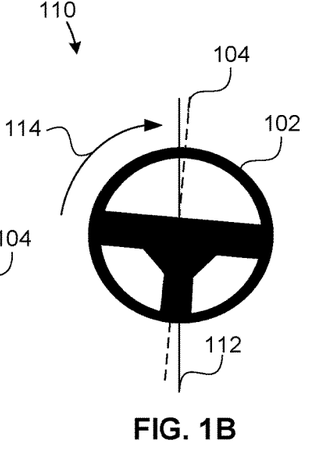
FIG. 1B illustrates an example second steering wheel position when an external angle controller (EAC) is used to turn the steering wheel to a target steering position angle.
Figure 1C:
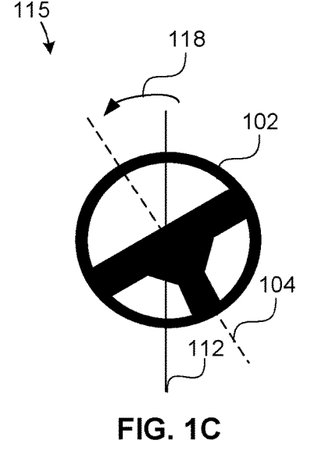
FIG. 1C illustrates an example third steering wheel position when steering assist is removed, causing the steering wheel to rebound.

FIG. 1A illustrates an example first steering wheel position 100 when an example steering wheel 102 has been turned by hand prior to being released. In the example of FIG. 1A, the steering wheel 102 can be turned to the left of the center, resulting in an angle of approximately 40 degrees relative to the center (e.g., as defined using axis 104). FIG. 1B illustrates an example second steering wheel position 110 when an external angle controller (EAC) is used to turn the steering wheel 102 (e.g., as shown using example wheel repositioning 114) to an example target steering position angle (e.g., as defined using an axis 112). In the example of FIG. 1B, the EAC can be used to hold the steering wheel in position to permit measurement of a difference in the steering wheel position (e.g., identification of how far off-center the axis 104 of the steering wheel 102 is from the target steering position angle or center axis 112). In some examples, the difference can result from rubber deformation due to tire wind up. In some examples, the difference in steering wheel position can be determined by calculating tire deformation on a contact patch and a resulting spring back. FIG. 1C illustrates an example third steering wheel position 115 when steering assist is removed (e.g., EAC is disabled), causing the steering wheel 102 to rebound (e.g., as shown using example wheel rebound angle 118). In the example of FIG. 1C, the position of the axis 104 of the steering wheel 102 is determined relative to the target steering position angle (e.g., the center axis 112) to determine a difference in the actual steering wheel 102 position versus a desired position of the steering wheel 102 (e.g., centered such that the axis 104 overlaps the target steering position angle or center axis 112 in this example).

Figure 1D:
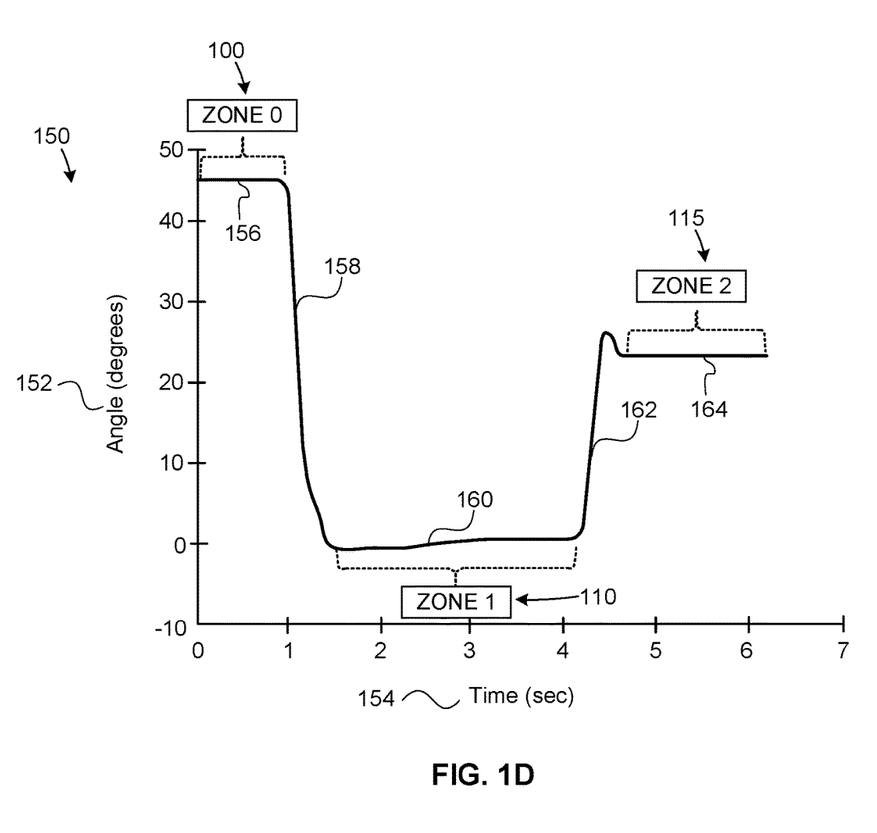
FIG. 1D is an example representation of a change in steering wheel angle over time as the steering wheel transitions from the first steering wheel position of FIG. 1A (e.g., zone 0) to the second steering wheel position of FIG. 1B (e.g., zone 1), and from the second steering wheel position of FIG. 1B (e.g., zone 1) to the third steering wheel position of FIG. 1C (e.g., zone 2).

FIG. 1D is an example representation 150 of a change in steering wheel angle 152 over example time 154 as the steering wheel 102 of FIGS. 1A, 1B, 1C transitions from the first steering wheel position 100 of FIG. 1A (e.g., zone 0) to the second steering wheel position 110 of FIG. 1B (e.g., zone 1), and from the second steering wheel position 110 of FIG. 1B (e.g., zone 1) to the third steering wheel position 115 of FIG. 1C (e.g., zone 2). In the example of FIG. 1D, the steering wheel 102 can be turned by hand to a starting position (e.g., first steering wheel position 100) prior to being released. In the example of FIG. 1D, the starting position of the steering wheel 102 is forty-five degrees from the center axis 112 (e.g., at zero degrees). In the first steering wheel position 100 (zone 0), the steering wheel 102 remains at the forty-five degree angle relative to the center axis 112 for approximately one second, as shown in the example first graph region 156. Once the external angle controller (EAC) is activated (e.g., example second graph region 158 as represented by the wheel repositioning 114 of FIG. 1B), the EAC returns the steering wheel 102 to the center axis 112 and holds the steering wheel 102 in position, as shown in the example third graph region 160 (e.g., zone 1 associated with the second steering wheel position 110). In some examples, a difference in the steering position angle can be determined by identifying whether the steering position angle is not aligned with the center axis 112. Once the steering assist is removed (e.g., the EAC is deactivated), the steering wheel 102 rebounds as shown in the example fourth graph region 162 (e.g., represented by the wheel repositioning 118 of FIG. 1C). Once electric powered steering is no longer activated, the steering wheel 102 repositions to a steering wheel position angle (e.g., at axis 104) different from the center axis 112, as shown in the example fifth graph region 164 (e.g., zone 2 associated with the third steering wheel position 115). In the example of FIG. 1D, the steering wheel 102 is at approximately twenty-two degrees off-center relative to the center axis 112. The methods and apparatus disclosed herein permit the steering wheel 102 to be repositioned accurately to match the center axis 112 even in the absence of steering assist (e.g., independent of actuators that would otherwise be needed to hold the steering wheel 102 in position).

Figure 2A:
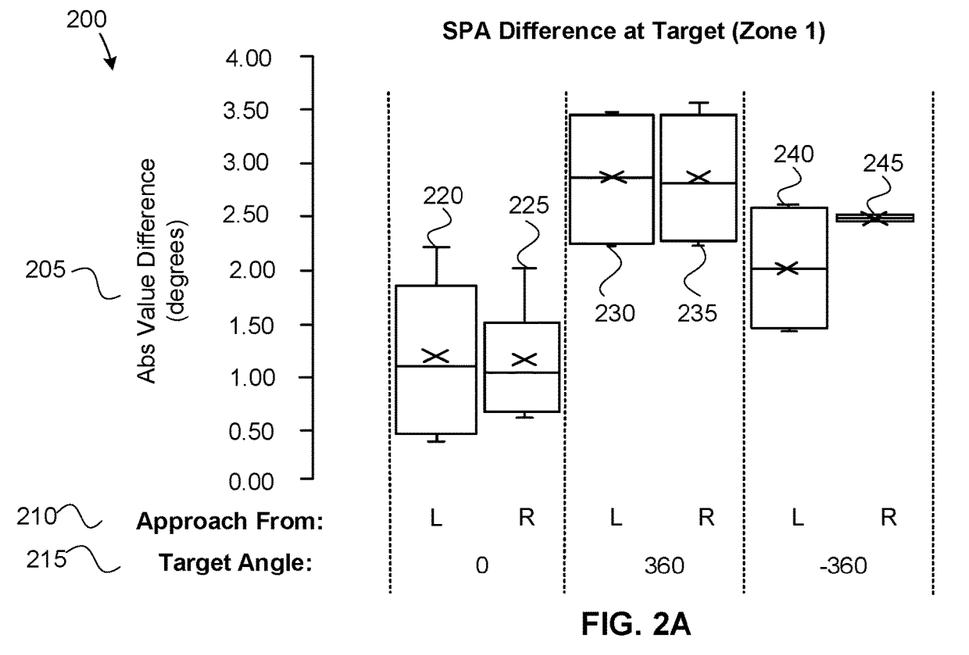
FIG. 2A illustrates example steering position angle (SPA) difference at the second steering wheel position of FIG. 1B (e.g., zone 1).

FIG. 2A illustrates an example steering position angle (SPA) difference 200 at the second steering wheel position 110 of FIG. 1B (e.g., zone 1). In the example of FIG. 2A, an absolute value difference (in degrees) 205 is determined based on a difference in the steering wheel position angle (e.g., defined by the steering wheel axis 104 of FIGS. 1B) and the target steering wheel position angle (e.g., defined by the center axis 112 of FIG. 1B). In some examples, the difference can result from rubber deformation due to tire wind up. In some examples, the difference in steering wheel position can be determined by calculating tire deformation on a contact patch and a resulting spring back. For example, after the steering wheel 102 has been turned by a user and the EAC has been engaged to reposition the steering wheel 102 back to the center axis 112, the difference 205 permits an evaluation of how far from the center axis 112 the steering wheel 102 is positioned. In the example of FIG. 2A, an example approach direction 210 can be from a left direction (L) or a right direction (R). For example, in the example of FIG. 1A, the steering wheel 102 is initially turned to the left prior to being repositioned towards the center axis 112 by the EAC. Likewise, the example target angle 215 can be set to 0 degrees, 360 degrees, and/or −360 degrees (e.g., as determined by testing conditions). The example box-and-whisker plot(s) 220, 225, 230, 235, 240, 245 of FIG. 2A present data for steering position absolute value difference 205 at zone 1 (e.g., after the EAC has turned the steering wheel 102 back to the target steering angle). For example, the absolute value difference 205 is highest for a target angle 215 setting of 360 degrees (e.g., box-and-whisker plots 230, 235) and lowest for a target angle 215 setting of 0 degrees (e.g., box-and-whisker plots 220, 225) for both left (L) and right (R) approach directions 210.

Figure 2B:
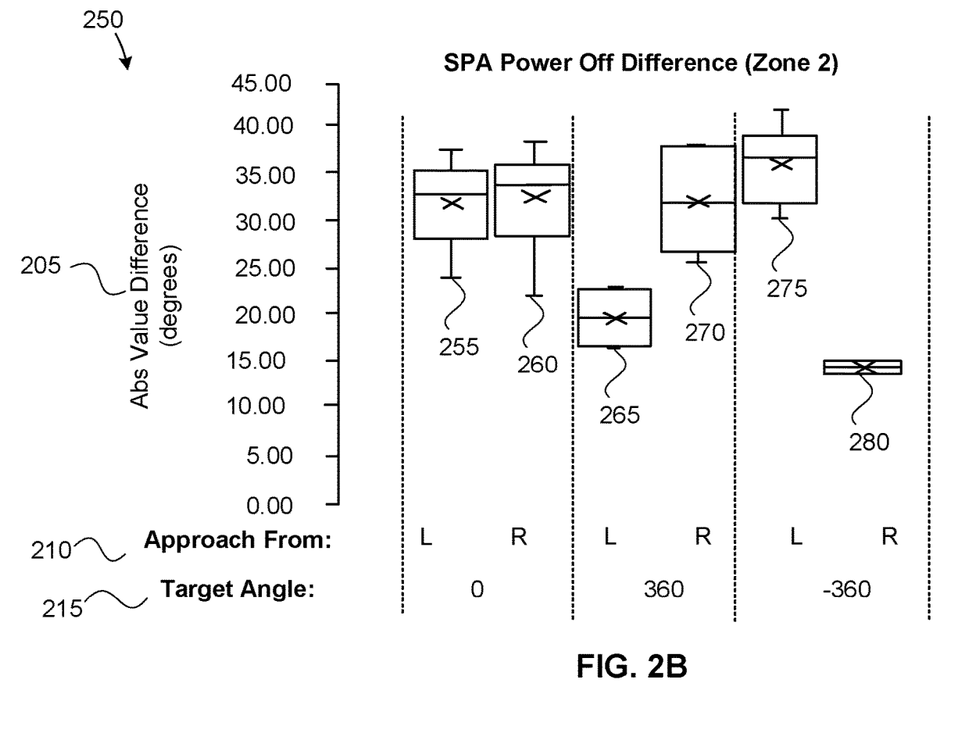
FIG. 2B illustrates example steering position angle (SPA) difference at the third steering wheel position of FIG. 1C (e.g., zone 2).

FIG. 2B illustrates example steering position angle (SPA) difference 250 at the third steering wheel position 115 of FIG. 1C (e.g., zone 2). In the example of FIG. 2B, the absolute value difference (in degrees) 205 is determined based on a difference in the steering wheel position angle (e.g., defined by the steering wheel axis 104 of FIGS. 1C) and the target steering wheel position angle (e.g., defined by the center axis 112 of FIG. 1C). For example, after steering assist is removed (e.g., actuator(s) no longer engaged to keep the steering wheel 102 in position), the difference 205 permits an evaluation of how far from the center axis 112 the steering wheel 102 is positioned after the steering wheel 102 rebounds. In the example of FIG. 2B, the approach direction 210 can be from a left direction (L) or a right direction (R). Likewise, the target angle 215 can be set to 0 degrees, 360 degrees, and/or −360 degrees (e.g., as determined by testing conditions). The example box-and-whisker plot(s) 255, 260, 265, 270, 275, 280 of FIG. 2B present data for steering position absolute value difference 205 at zone 1 (e.g., after power steering is no longer activated). For example, the absolute value difference 205 for a left-based approach direction 210 is highest for a target angle 215 setting of −360 degrees (e.g., box-and-whisker plot 275) and lowest for a target angle 215 setting of 360 degrees (e.g., box-and-whisker plot 265). In comparison, the absolute value difference 205 for a right-based approach direction 210 is highest for a target angle 215 setting of 0 and 360 degrees (e.g., box-and-whisker plots 260, 270) and lowest for a target angle 215 setting of −360 degrees (e.g., box-and-whisker plot 280).

Figure 3A:
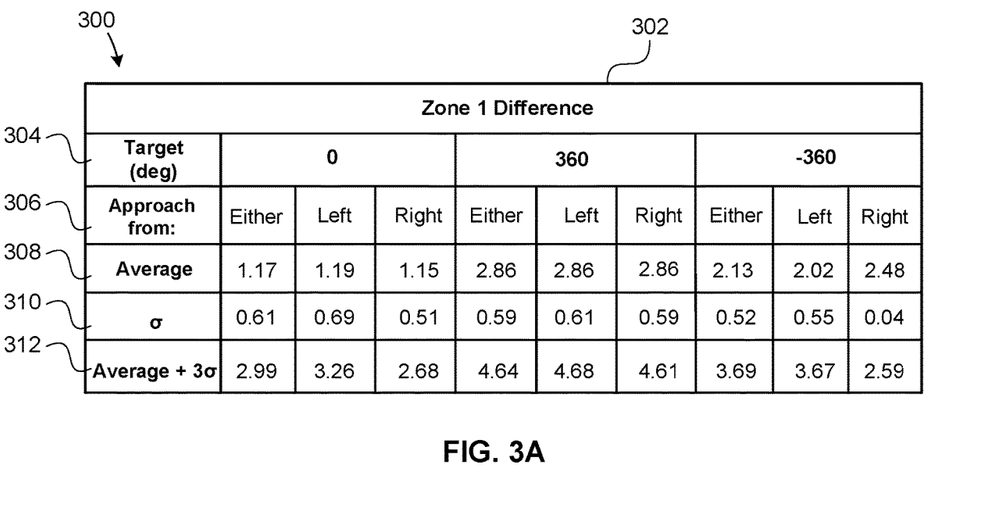
FIG. 3A illustrates an example tabulated form of the steering position angle (SPA) difference of zone 1 as presented in connection with FIG. 2A.
Figure 3B:
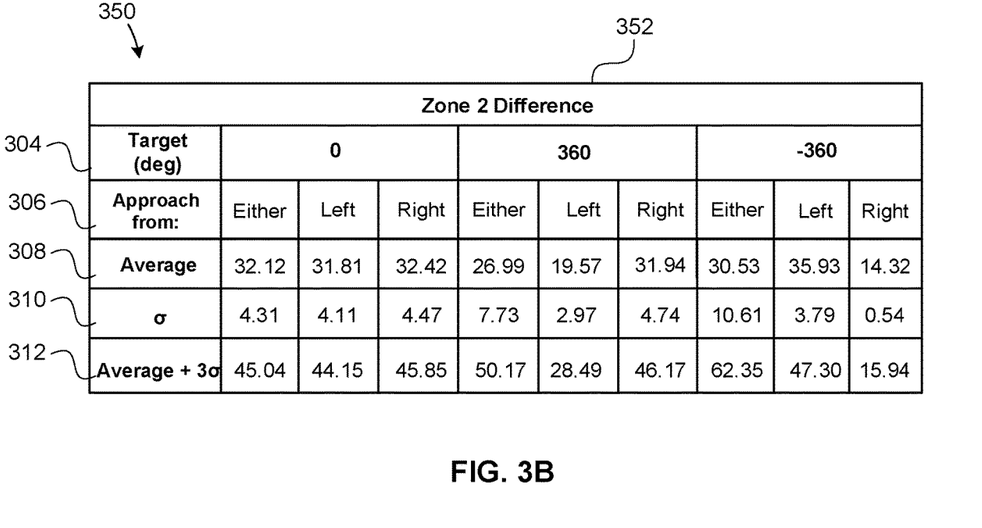
FIG. 3B illustrates an example tabulated form of the steering position angle (SPA) difference of zone 2 as presented in connection with FIG. 2B.

FIG. 3A illustrates an example tabulated form 300 of the steering position angle (SPA) difference 200 of zone 1 as presented in connection with FIG. 2A. FIG. 3B illustrates an example tabulated form 350 of the steering position angle (SPA) difference 250 of zone 2 as presented in connection with FIG. 2B. In the example of FIGS. 3A and 3B, the collected data includes an example target angle (in degrees) 304 (e.g., 0, 360, −360 degrees), an example approach direction 306 (e.g., left, right, either), an example average difference 308, an example standard deviation (σ) 310, and an example sum 312 of the average difference 308 and three times the standard deviation (σ) 310. In the example of FIGS. 3A and 3B, the data includes zone 1 difference 302 (e.g., in connection with FIGS. 1B and 1D) and zone 2 difference 352 (e.g., in connection with FIGS. 1C and 1D), respectively. Based on the data presented in connection with FIGS. 2A-2B and FIGS. 3A-3B, it is apparent that the steering position angle difference 250 (e.g., zone 2 difference 352) is greater overall compared to the steering position angle difference 200 (e.g., zone 1 difference 302). As such, it is necessary to return the steering wheel 102 to a centered position (e.g., along the center axis 112). For example, a stowable steering wheel (e.g., steering wheel 102) may not be able to retract until it has been centered. Methods and apparatus disclosed herein address this challenge by determining (e.g., using a steering position sensor) if the steering wheel 102 is centered and correcting (e.g., using the EAC) the steering angle (e.g., aligning the steering position angle as defined by the steering wheel axis 104 with the center axis 112), as described in more detail in connection with FIG. 4.

Figure 4:
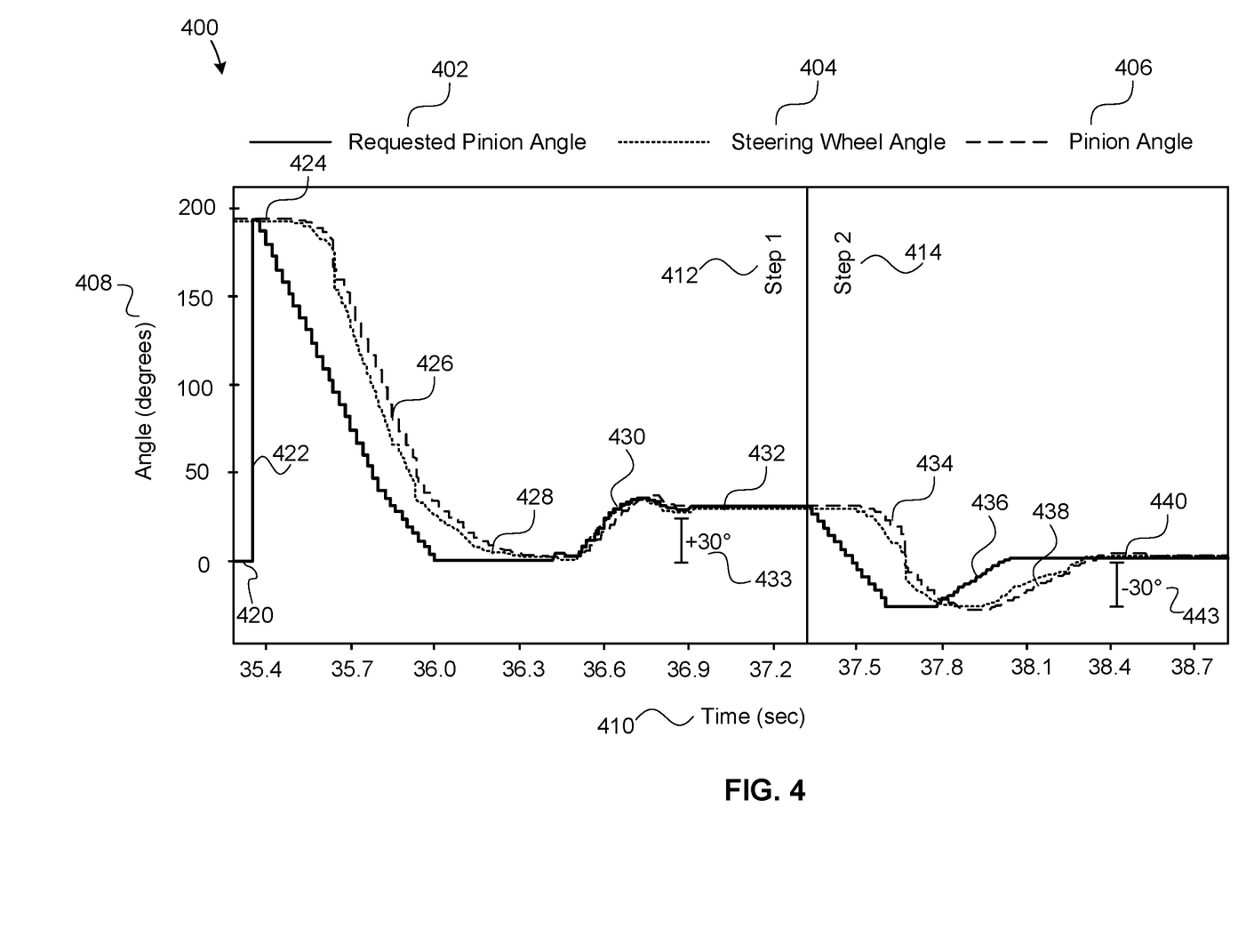
FIG. 4 is an example representation of changes in actual pinion angle, steering wheel angle, and requested pinion angle over time.

FIG. 4 is an example representation 400 of real-time measurements of example requested pinion angle 402, example steering wheel angle 404, and example actual pinion angle 406. The representation 400 of FIG. 4 includes a measurement of an example angle 408 corresponding to the requested pinion angle 402, the steering wheel angle 404, and/or the actual pinion angle 406 over time 410. The measurements of the requested pinion angle 402, the steering wheel angle 404, and/or the actual pinion angle 406 can be divided into two step(s), a first step (step 1) 412 and a second step (step 2) 414. While the measurements recorded in the first step 412 mirror the data described in connection with FIG. 1D, the measurements recorded in the second step 414 present a solution to obtain a corrected and/or centered steering wheel position. For example, the steering wheel 102 (e.g., steering wheel angle 404) is initially at approximately two hundred degrees from the center axis 112. The requested pinion angle 402 and the actual pinion angle 406 differ over time due to a time delay between the requested pinion angle 402 and the actual pinion angle 406. For example, while initially the requested pinion angle 402 is at zero degrees (e.g., example first time interval 420), the actual pinion angle 406 is equivalent to the real-time steering wheel angle 404. Once the steering wheel 102 is released, the EAC actively turns the steering wheel 102 to the target steering position angle (e.g., from example second time interval 424 to example third time interval 426). Subsequently, the EAC holds the steering wheel 102 in position (e.g., at example fourth time interval 428). In the example of FIG. 4, the actual pinion angle 406 rapidly moves towards zero as the EAC returns the steering wheel towards the center axis 112. As the steering wheel angle 404 and the actual pinion angle 406 near zero degrees, the rate of change of the requested pinion angle 402 slows down as the fourth time interval 428 is approached. Similarly, at the fourth time interval 428, the EAC can be disabled once the requested pinion angle 402, the steering wheel angle 404, and/or the actual pinion angle 406 have returned to zero degrees. In the example of FIG. 4, disabling the EAC results in the steering wheel 102 rebounding, as shown at a sixth time interval 430. In the example of FIG. 4, the steering wheel (e.g., including the requested pinion angle 402, the steering wheel angle 404, and/or the actual pinion angle 406) result in a rebound angle 433 (e.g., of approximately +30 degrees) from the center axis 112. The requested pinion angle 402, the steering wheel angle 404, and/or the actual pinion angle 406 continue to remain at the same rebound angle 433 (e.g., at the seventh time interval 432), thereby resulting in a steering wheel 102 position that is off-center.

To correct the steering wheel and return the requested pinion angle 402, the steering wheel angle 404, and/or the actual pinion angle 406 to the center (e.g., zero degrees), a difference can be determined between the center axis 112 and the steering wheel position angle (e.g., based on a comparison of the steering wheel axis 104 of FIG. 1C and the center axis 112). The EAC can be used to ramp the steering angle to the opposite of the calculated difference between the steering wheel position angle and the center axis 112. In the example of FIG. 4, the EAC ramps the steering wheel a total of −30 degrees to account for the rebound angle 433 (e.g., +30 degrees). As such, the requested pinion angle 402 is reduced by the desired amount (e.g., −30 degrees) during the example eighth time interval 434, resulting in the decreased angles of the steering wheel angle 404, and/or the actual pinion angle 406. As such, once the EAC is again disabled, the requested pinion angle 402 rebounds based on the rebound angle 433 (e.g., +30 degrees), as shown during an example ninth time interval 436, followed by the rebounding of the steering wheel angle 404, and/or the actual pinion angle 406 (e.g., as shown in the example tenth time interval 438). As such, the steering wheel 102 is centered (e.g., steering wheel axis 104 matches the center axis 112), and the requested pinion angle 402, the steering wheel angle 404, and/or the actual pinion angle 406 are positioned at an angle of zero degrees relative to the center axis 112. Based on these steps, the steering wheel 102 achieves a stable, centered position (e.g., as shown in the example eleventh time interval 440) as a result of the rebounding of the steering wheel by the determined example difference 443 between the steering wheel position angle and the center axis 112 (e.g., −30 degrees).

Figure 5:
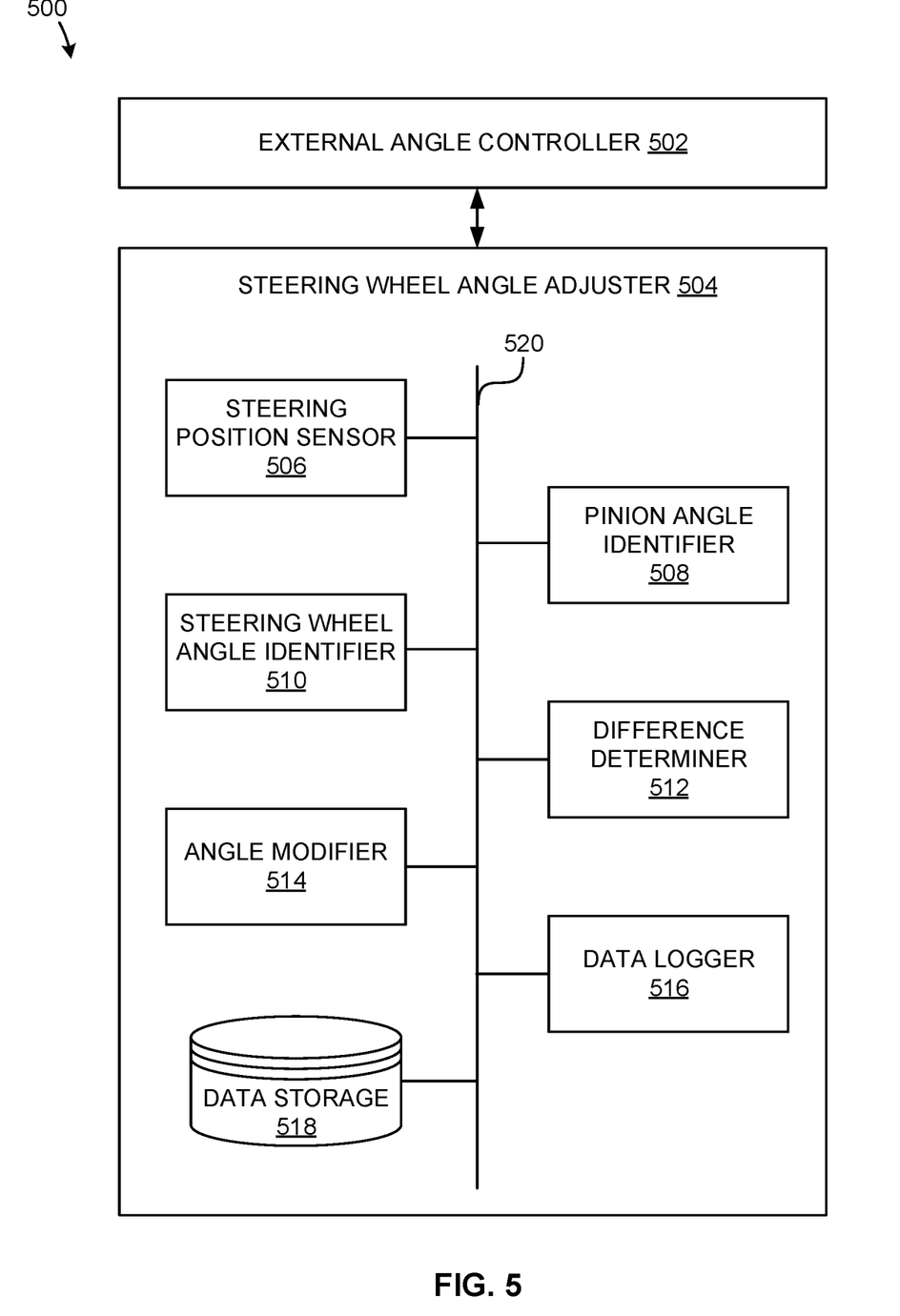
FIG. 5 is a block diagram of an example implementation of a steering wheel angle adjuster in which the examples disclosed herein can be implemented.

FIG. 5 is a block diagram 500 of an example implementation of a steering wheel angle adjuster 504 in which the examples disclosed herein can be implemented. FIG. 5 includes an example external angle controller (EAC) 502. The EAC 502 interacts with the steering wheel angle adjuster 504 to center the steering wheel 102. The steering wheel angle adjuster 504 includes an example steering position sensor 506, an example pinion angle identifier 508, an example steering wheel angle identifier 510, an example difference determiner 512, an example angle modifier 514, an example data logger 516, and an example data storage 518. In the example of FIG. 5, the steering position sensor 506, the pinion angle identifier 508, the steering wheel angle identifier 510, the difference determiner 512, the angle modifier 514, the data logger 516, and the data storage 518 are in communication via an example bus 520.

The external angle controller (EAC) 502 provides control over the steering wheel 102 angle relative to the center axis 112. For example, the EAC 502 can be used to power the steering wheel 102 (e.g., using actuators, etc.) to provide movement of the wheel 102 independent of user-based interaction. As described in connection with FIG. 1D and FIG. 5, the EAC 502 can be used to change the steering wheel angle. In some examples, the EAC 502 can be used to rapidly move the steering wheel 104 towards the center (e.g., the center axis 112). In some examples, the EAC 502 ramps the steering angle to an angle opposite of the total difference between the steering wheel angle (e.g., based on the real-time steering wheel axis 104) and an angle defined by the center axis 112. As such, once the electric steering power is disabled (e.g., the EAC 502 is deactivated), the steering wheel 102 can return to the center (e.g., the real-time steering wheel axis 104 overlaps the center axis 112). This allows the EAC 502 to adjust a first steering position angle (e.g., defined by the real-time steering wheel axis 104) to a second steering position angle (e.g., defined by the center axis 112) based on a difference between the first steering position angle and the second steering position angle. Once the second steering position angle corresponds to the centered steering wheel position, the steering wheel can be stowed. In some examples, the EAC 502 interacts with the steering wheel angle adjuster 504 to identify the first steering position angle and the second steering position angle, as well as determine by how much the steering wheel 102 may need to be ramped to center the wheel 102 once the electric power steering is turned off.

The steering position sensor 506 identifies a position of the steering wheel 102. In some examples, the steering position sensor 506 is disposed in a steering column of the vehicle. In some examples, the steering position sensor 506 can be used to determine whether the steering wheel 102 is centered. In some examples, input from the steering position sensor 506 can be used by the pinion angle identifier 508 and/or the steering wheel angle identifier 510 to determine a pinion angle (e.g., requested pinion angle 402, actual pinion angle 406) and/or a steering wheel angle (e.g., steering wheel angle 404).

The pinion angle identifier 508 determines the requested pinion angle 402 and/or the actual pinion angle 406 of the steering system. In some examples, the pinion angle identifier 508 compares a first pinion position angle to a second pinion position angle, where the second pinion position angle corresponds to a centered steering wheel position (e.g., as determined using the center axis 112). In some examples, the pinion angle identifier 508 is used to confirm a position of the steering wheel 102 relative to a center axis 112. In some examples, the pinion angle identifier 508 can be used to determine the requested pinion angle 402 of FIG. 4 and/or the actual pinion angle 406 of FIG. 4 to identify whether the requested pinion angle 402 matches the actual pinion angle 406 over time.

The steering wheel angle identifier 510 determines the steering wheel angle 404 of the steering system. In some examples, the steering wheel angle identifier 510 compares a first steering wheel position angle to a second steering wheel position angle, where the second steering wheel position angle corresponds to a centered steering wheel position (e.g., as determined using the center axis 112). In some examples, the steering wheel angle identifier 510 is used to confirm a position of the steering wheel 102 relative to the center axis 112.

The difference determiner 512 identifies a difference associated with an angle of the steering wheel 102. For example, the difference determiner 512 can be used to determine the steering position angle difference 200 (e.g., at zone 1 of FIG. 1B) and/or the steering position angle difference 250 (e.g., at zone 2 of FIG. 1C). For example, the difference determiner 512 can determine how far from the center axis 112 the steering wheel axis 104 is located. In the example of FIG. 1B, the difference determiner 512 identifies how far from the center axis 112 the steering wheel 102 is positioned once the EAC 502 turns the steering wheel to a target steering position angle (e.g., zone 1 difference). In the example of FIG. 1C, the difference determiner 512 identifies how far from the center axis 112 the steering wheel 102 is positioned once steering assist is removed and the steering wheel 102 rebounds (e.g., zone 2 difference).

The angle modifier 514 adjusts the steering wheel position angle (e.g., a first steering position angle) to match the second steering position angle (e.g., a position angle that corresponds to a centered steering wheel position). For example, once the difference determiner 512 determines a rebound angle (e.g., rebound angle 433) based on the offset of the steering wheel 102 position from the center axis 112, the angle modifier 514 can be used to adjust the steering wheel position (e.g., using the EAC 502) to match the center axis 112.

The data logger 516 logs any data associated with input from the steering position sensor 506, the pinion angle identifier 508, the steering wheel angle identifier 510, the difference determiner 512, and/or the angle modifier 514. In some examples, the data logger 516 records the requested pinion angle 402, the steering wheel angle 404, and/or the actual pinion angle 406. In some examples, the data logger 516 records changes in angle readings over time (e.g., time 410) to identify changes in steering wheel positioning with respect to the center axis 112. In some examples, the data logger 516 records changes in the rebound angle (e.g., rebound angle 433) based on displacement of the steering wheel 102 from the center axis 112.

The data storage 518 can be used to store any information associated with the external angle controller 502, the steering position sensor 506, the pinion angle identifier 508, the steering wheel angle identifier 510, the difference determiner 512, and/or the angle modifier 514. In some examples, the data storage 518 stores generated graphs, identified differences, and/or applied steering wheel angle corrections. The example data storage 518 of the illustrated example of FIG. 5 can be implemented by any memory, storage device and/or storage disc to store data such as flash memory, magnetic media, optical media, storage on cloud, etc. Furthermore, the data stored in the example data storage 518 can be in any data format such as binary data, comma delimited data, tab delimited data, structured query language (SQL) structures, image data, etc.

While an example manner of implementing the steering wheel angle adjuster 504 is illustrated in FIG. 5, one or more of the elements, processes and/or devices illustrated in FIG. 5 may be combined, divided, re-arranged, omitted, eliminated and/or implemented in any other way. Further, the example steering position sensor 506, the example pinion angle identifier 508, the example steering wheel angle identifier 510, the example difference determiner 512, the example angle modifier 514, the example data logger 516, and/or more generally the steering wheel angle adjuster 504, may be implemented by hardware, software, firmware and/or any combination of hardware, software and/or firmware. Thus, for example, any of the example steering position sensor 506, the example pinion angle identifier 508, the example steering wheel angle identifier 510, the example difference determiner 512, the example angle modifier 514, the example data logger 516, and/or more generally the steering wheel angle adjuster 504 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable logic device(s) (FPLD(s)), and/or field-programmable gate array (FPGA)). When reading any of the apparatus or system claims of this patent to cover a purely software and/or firmware implementation, at least one of the example steering position sensor 506, the example pinion angle identifier 508, the example steering wheel angle identifier 510, the example difference determiner 512, the example angle modifier 514, the example data logger 516, and/or more generally the steering wheel angle adjuster 504 is/are hereby expressly defined to include a non-transitory computer readable storage device or storage disk such as a memory, a digital versatile disk (DVD), a compact disk (CD), a Blu-ray disk, etc. including the software and/or firmware. Further still, the example steering wheel angle adjuster 504 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
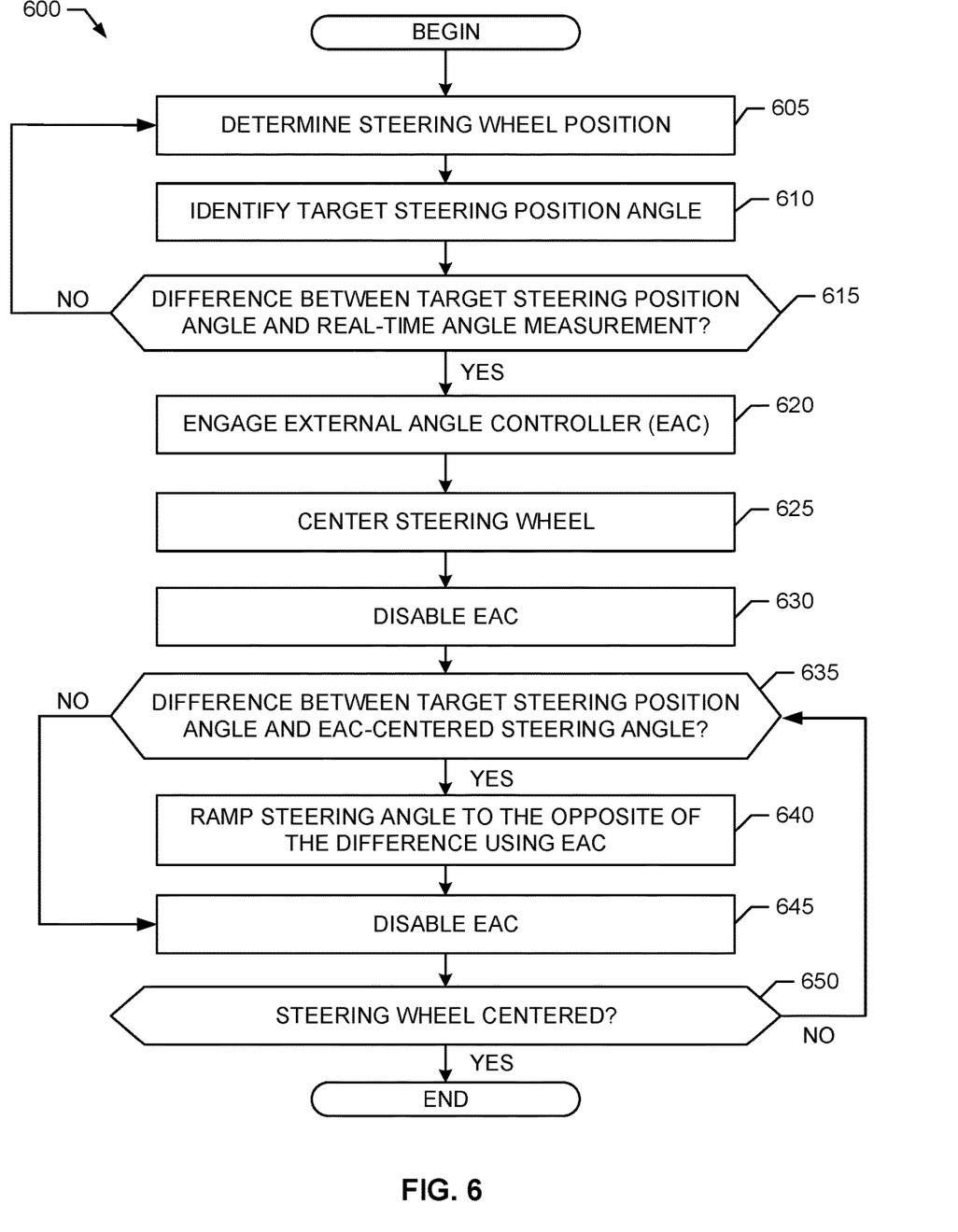
FIG. 6 illustrates a flowchart representative of example machine readable instructions which may be executed to implement the example steering wheel angle adjuster of FIG. 5.

A flowchart representative of example hardware logic, machine readable instructions, hardware implemented state machines, and/or any combination thereof for implementing the steering wheel angle adjuster 504 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entirety of the program(s) and/or parts thereof could alternatively be executed by a device other than the processor 712 and/or embodied in firmware or dedicated hardware. Further, although the example program(s) is/are described with reference to the flowchart illustrated in FIG. 6, many other methods of implementing the example steering wheel angle adjuster 504 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 illustrates a flowchart representative of example machine readable instructions 600 which may be executed to implement the example steering wheel angle adjuster 504 of FIG. 5. In the example of FIG. 6, the steering position sensor 506 determines the steering wheel position (block 605). For example, the steering position sensor 506 determines the location of the steering wheel 102 relative to the center axis 112 of FIGS. 1A, 1B, 1C. Based on input from the steering position sensor 506, the pinion angle identifier 508 and/or the steering wheel angle identifier 510 can determine the real-time pinion angle and/or the steering wheel angle 404. In some examples, the pinion angle identifier 508 and/or the steering wheel angle identifier 510 can be used to identify a target steering position angle (block 610). The steering wheel angle adjuster 504 (e.g., the pinion angle identifier 508 and/or the steering wheel angle identifier 510) compares a first steering position angle to a second steering position angle, where the second steering position angle corresponds to a centered steering wheel position. If the steering wheel angle adjuster 504 determines that a difference exists between the target steering position angle (e.g., as determined using the center axis 112) and a real-time steering position angle measurement (block 615), the steering wheel angle adjuster 504 engages the external angle controller (EAC) 502 (block 620). In the absence of a difference between the target steering position angle (e.g., as determined using the center axis 112) and the real-time angle measurement, the steering wheel angle adjuster 504 continues to receive and process input from the steering position sensor 506 until a difference is identified.

Once the EAC 502 is engaged (block 620), the EAC 502 centers the steering wheel 102 by moving the steering wheel 102 towards the target steering position angle (e.g., as defined by the center axis 112) (block 625). Once the EAC 502 has re-positioned the steering wheel 102 relative to the center axis 112, the EAC 502 is disabled (block 630), allowing the difference determiner 512 to identify a difference between the target steering position angle (e.g., defined by the center axis 112) and the EAC-centered steering angle (block 635). If the difference determiner 512 identifies a difference in the two angle measurements, the angle modifier 514 adjusts the off-center steering position angle to match the target steering position angle (e.g., the target steering position angle corresponding to the centered steering wheel position). For example, the angle modifier 514 can engage the EAC 502 to ramp the steering angle to the opposite of the determined difference in the angle measurements (block 640). For example, if the steering wheel 102 is determined to be displaced a total of +30 degrees from the center axis 112, the angle modifier 514 engages the EAC 502 to ramp the steering wheel to −30 degrees from the center axis 112. As such, when the EAC 502 is disabled (block 645), the steering wheel rebounds such that the steering wheel position angle (e.g., as defined using axis 104 of FIGS. 1A, 1B, 1C) matches the target steering position angle (e.g., as defined using the center axis 112). If the difference determiner 512 does not identify a difference between the target steering position angle and the EAC-centered steering angle, the EAC 502 is disabled (block 645). Subsequently, the steering wheel angle adjuster 504 can verify whether the steering wheel is centered based on input from the steering position sensor 506, as well as the pinion angle identifier 508 and/or the steering wheel angle identifier 510. Once the steering wheel is centered (block 650), the steering wheel can be stowed. However, if steering wheel angle adjuster 504 determines that the steering wheel 102 is not yet fully centered (e.g., the steering wheel axis 104 does not overlie the center axis 112), control is returned to the difference determiner 512 to identify the difference between the target steering position angle (e.g., defined by the center axis 112) and the EAC-centered steering angle in order to determine by how much the EAC should adjust the steering wheel 102 position angle to match the target steering position angle.

Figure 7:
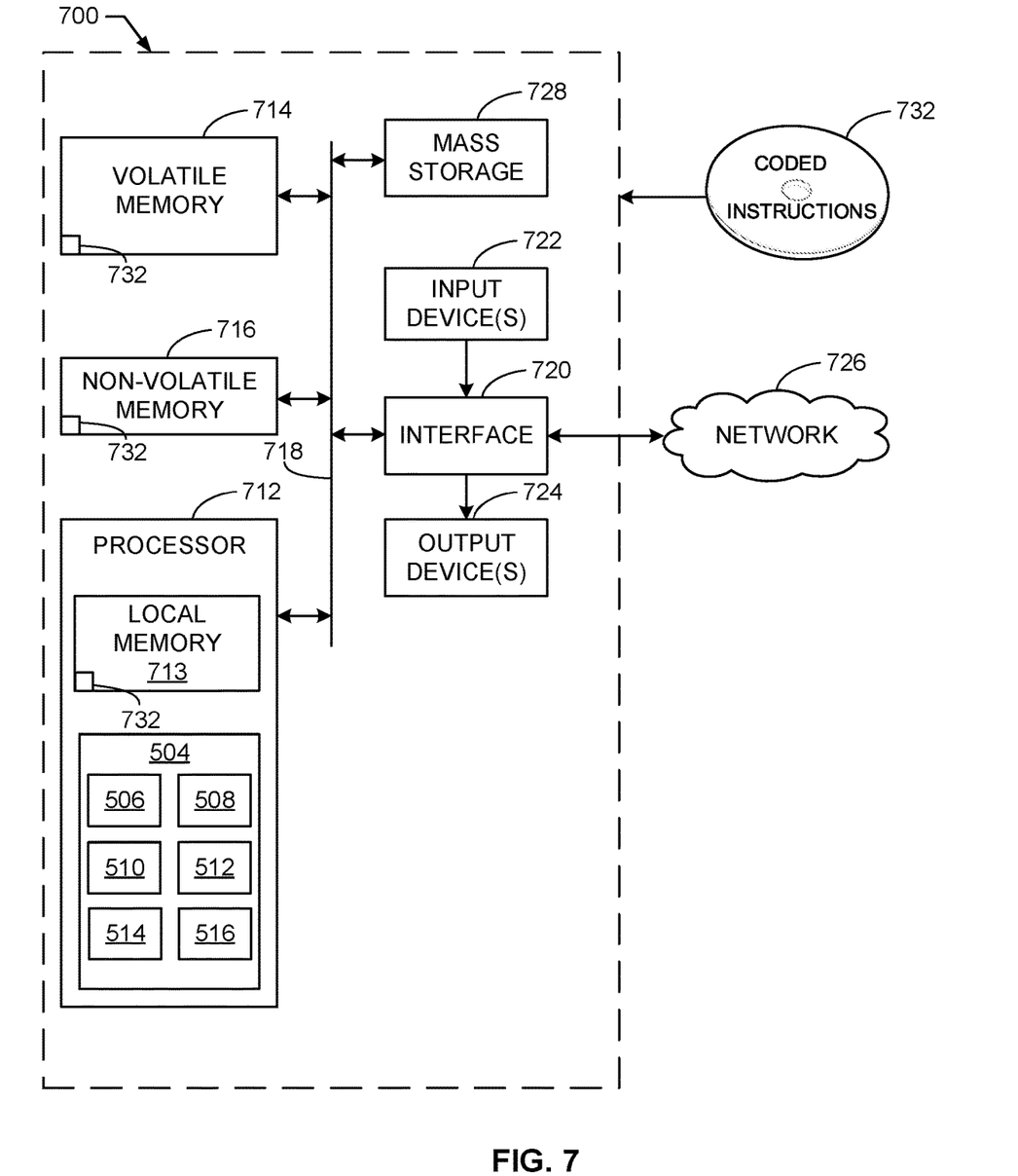
FIG. 7 is a block diagram of an example processing platform structured to execute the instructions of FIG. 6 to implement the example steering wheel angle adjuster of FIG. 5.

FIG. 7 is a block diagram of an example processing platform 700 structured to execute the instructions of FIG. 6 to implement the example steering wheel angle adjuster 504 of FIG. 5. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In this example, the processor 712 implements the example steering position sensor 506, the example pinion angle identifier 508, the example steering wheel angle identifier 510, the example difference determiner 512, the example angle modifier 514, and/or the example data logger 516.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 represented in FIG. 6 may be stored in the mass storage device 728, in the volatile memory 714, in the non-volatile memory 716, in the local memory 713 and/or on a removable non-transitory computer readable storage medium, such as a CD or DVD.

From the foregoing, it will be appreciated that example methods, systems, apparatus, and articles of manufacture have been disclosed to allow a steering wheel to be centered. For example, a steering position sensor in the steering column can be used to determine whether the steering wheel is centered by using an existing external angle controller (EAC) in an electrical power steering system. For examples, while the EAC can be used to rapidly move the steering wheel back to a center position, the steering angle can be measured again to identify a steering angle difference once the EAC has been disabled. In the examples disclosed herein, the EAC can be used to ramp the steering wheel to the opposite of an identified angle difference (e.g., an offset of 10 degrees would result in the EAC ramping the steering wheel to −10 degrees). As such, the steering wheel can remain centered once EAC is disabled again. The methods and apparatus disclosed herein thereby permit a steering wheel to remain centered once actuators have been disengaged and forces are no longer provided to hold the steering position in place. Accordingly, the methods and apparatus disclosed herein can be used to correct steering position resulting from load changes (e.g., tire deformation) that can cause a steering wheel to move off-center when power steering is no longer engaged to hold the steering wheel position in the center.

The following paragraphs provide various examples and combinations of the examples disclosed herein:

Example 1 includes a vehicle comprising a steering position sensor to identify a steering wheel position, a pinion angle identifier to compare a first steering position angle to a second steering position angle, the second steering position angle corresponding to a centered steering wheel position, and an angle modifier to adjust the first steering position angle to match the second steering position angle.

Example 2 includes the vehicle of example 1, wherein the steering position sensor is disposed in a steering column or on a pinion of a steering rack.

Example 3 includes the vehicle of example 1, wherein the first steering position angle is adjusted using an external angle controller, the external angle controller to adjust the first steering position angle to the second steering position angle based on a difference between the first steering position angle and the second steering position angle.

Example 4 includes the vehicle of example 3, wherein the external angle controller is to ramp the steering wheel position to an angle opposite of the identified difference between the first steering position angle and the second steering position angle.

Example 5 includes the vehicle of example 3, wherein the external angle controller is disabled when the steering wheel is centered.

Example 6 includes the vehicle of example 1, wherein, when the second steering position angle corresponds to the centered steering wheel position, the steering wheel is stowed.

Example 7 includes the vehicle of example 1, wherein the second steering position angle differs from the first steering position angle due to tire deformation-based loading.

Example 8 includes the vehicle of example 1, wherein the steering wheel is centered independently of one or more actuators.

Example 9 includes a method, comprising identifying, using a steering position sensor, a steering wheel position, comparing a first steering position angle to a second steering position angle, the second steering position angle corresponding to a centered steering wheel position, and adjusting the first steering position angle to match the second steering position angle.

Example 10 includes the method of example 9, wherein the steering position sensor is disposed in a steering column or on a pinion of a steering rack.

Example 11 includes the method of example 9, further including adjusting the first steering position angle to match the second steering position angle using an external angle controller.

Example 12 includes the method of example 11, further including adjusting, via the external angle controller, the first steering position angle to the second steering position angle based on a difference between the first steering position angle and the second steering position angle.

Example 13 includes the method of example 12, further including ramping, via the external angle controller, the steering wheel position to an angle opposite of the identified difference between the first steering position angle and the second steering position angle.

Example 14 includes the method of example 11, further including disabling the external angle controller when the steering wheel is centered.

Example 15 includes a non-transitory computer readable storage medium comprising instructions that, when executed, cause a processor to at least identify a steering wheel position, compare a first steering position angle to a second steering position angle, the second steering position angle corresponding to a centered steering wheel position, and adjust the first steering position angle to match the second steering position angle.

Example 16 includes the non-transitory computer readable storage medium of example 15, wherein the instructions, when executed, cause the processor to adjust the first steering position angle to match the second steering position angle using an external angle controller.

Example 17 includes the non-transitory computer readable storage medium of example 15, wherein the instructions, when executed, cause the processor to adjust the first steering position angle to the second steering position angle based on a difference between the first steering position angle and the second steering position angle.

Example 18 includes the non-transitory computer readable storage medium of example 17, wherein the instructions, when executed, cause the processor to ramp the steering wheel position to an angle opposite of the identified difference between the first steering position angle and the second steering position angle.

Example 19 includes the non-transitory computer readable storage medium of example 16, wherein the instructions, when executed, cause the processor to disable the external angle controller when the steering wheel is centered.

Example 20 includes the non-transitory computer readable storage medium of example 15, wherein the instructions, when executed, cause the processor to identify the steering wheel position using a steering position sensor, the steering position sensor disposed in a steering column.

Although certain example methods, systems, apparatus, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle comprising:
 a steering position sensor to identify a steering wheel position;
 a pinion angle identifier to compare a first steering position angle to a second steering position angle, the second steering position angle corresponding to a centered steering wheel position; and
 an angle modifier to adjust the first steering position angle to match the second steering position angle.

2. The vehicle of claim 1, wherein the steering position sensor is disposed in a steering column or on a pinion of a steering rack.

3. The vehicle of claim 1, wherein the first steering position angle is adjusted using an external angle controller, the external angle controller to adjust the first steering position angle to the second steering position angle based on a difference between the first steering position angle and the second steering position angle.

4. The vehicle of claim 3, wherein the external angle controller is to ramp the steering wheel position to an angle opposite of the difference between the first steering position angle and the second steering position angle.

5. The vehicle of claim 3, wherein the external angle controller is disabled when the steering wheel is centered.

6. The vehicle of claim 1, wherein, when the second steering position angle corresponds to the centered steering wheel position, the steering wheel is stowed.

7. The vehicle of claim 1, wherein the second steering position angle differs from the first steering position angle due to tire deformation-based loading.

8. The vehicle of claim 1, wherein the steering wheel is centered independently of one or more actuators.

9. A method, comprising:
identifying, using a steering position sensor, a steering wheel position;
comparing a first steering position angle to a second steering position angle, the second steering position angle corresponding to a centered steering wheel position; and
adjusting the first steering position angle to match the second steering position angle.

10. The method of claim 9, wherein the steering position sensor is disposed in a steering column or on a pinion of a steering rack.

11. The method of claim 9, further including adjusting the first steering position angle to match the second steering position angle using an external angle controller.

12. The method of claim 11, further including adjusting, via the external angle controller,
the first steering position angle to the second steering position angle based on a difference between the first steering position angle and the second steering position angle.

13. The method of claim 12, further including ramping, via the external angle controller, the steering wheel position to an angle opposite of the difference between the first steering position angle and the second steering position angle.

14. The method of claim 11, further including disabling the external angle controller when the steering wheel is centered.

15. A non-transitory computer readable storage medium comprising instructions that, when executed, cause a processor to at least:
identify a steering wheel position;
compare a first steering position angle to a second steering position angle, the second steering position angle corresponding to a centered steering wheel position; and
adjust the first steering position angle to match the second steering position angle.

16. The non-transitory computer readable storage medium of claim 15, wherein the instructions, when executed, cause the processor to adjust the first steering position angle to match the second steering position angle using an external angle controller.

17. The non-transitory computer readable storage medium of claim 15, wherein the instructions, when executed, cause the processor to adjust the first steering position angle to the second steering position angle based on a difference between the first steering position angle and the second steering position angle.

18. The non-transitory computer readable storage medium of claim 17, wherein the instructions, when executed, cause the processor to ramp the steering wheel position to an angle opposite of the difference between the first steering position angle and the second steering position angle.

19. The non-transitory computer readable storage medium of claim 16, wherein the instructions, when executed, cause the processor to disable the external angle controller when the steering wheel is centered.

20. The non-transitory computer readable storage medium of claim 15, wherein the instructions, when executed, cause the processor to identify the steering wheel position using a steering position sensor, the steering position sensor disposed in a steering column.

* * * * *